M. H. MATTHEWS.
APPARATUS FOR ELEVATING OR CONVEYING BOXES OR OTHER ARTICLES.
APPLICATION FILED NOV. 12, 1918.
1,361,273.
Patented Dec. 7, 1920.
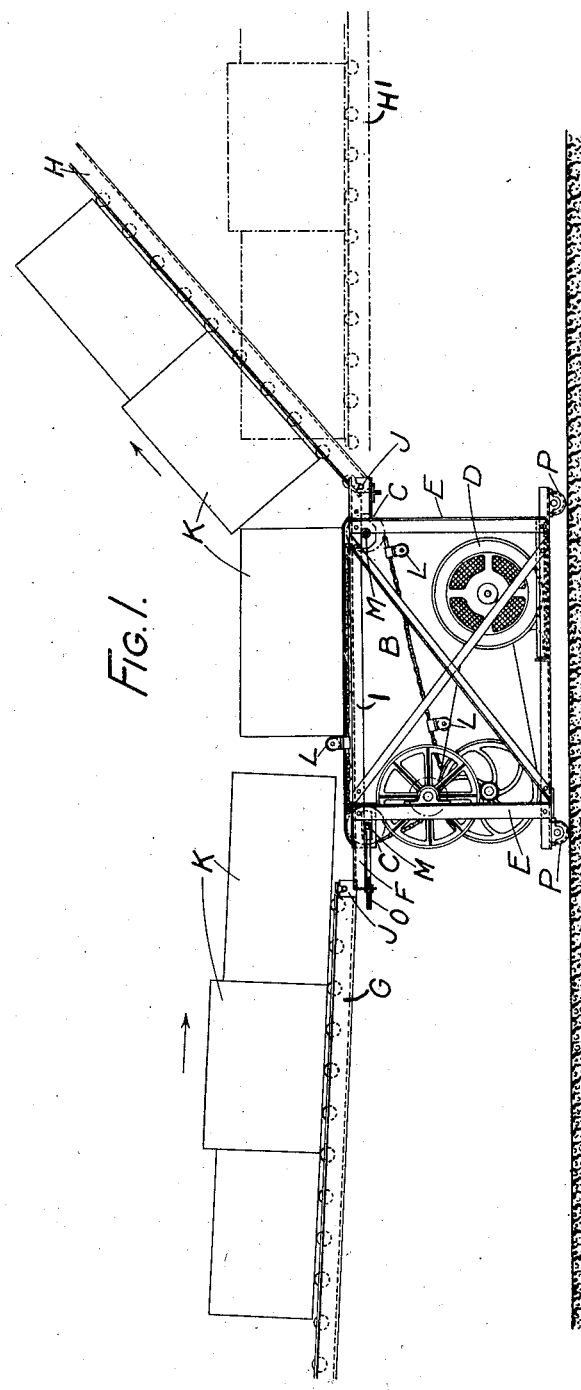
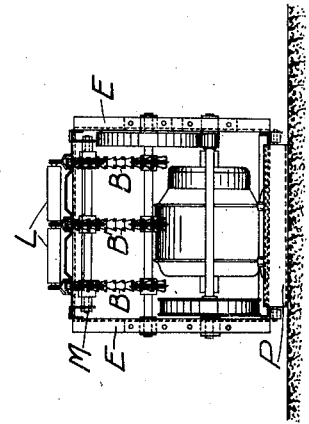
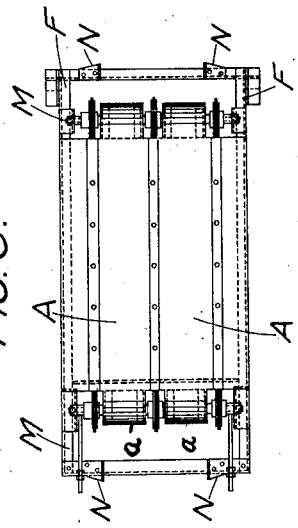
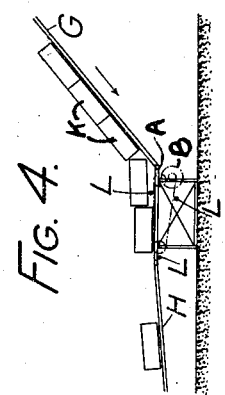

UNITED STATES PATENT OFFICE.

MATTHEW HENRY MATTHEWS, OF LONDON, ENGLAND, ASSIGNOR TO ROWNSON, DREW & CLYDESDALE INCORPORATED, OF NEW YORK, N. Y.

APPARATUS FOR ELEVATING OR CONVEYING BOXES OR OTHER ARTICLES.

1,361,273. Specification of Letters Patent. Patented Dec. 7, 1920.

Application filed November 12, 1918. Serial No. 262,138.

*To all whom it may concern:*

Be it known that I, MATTHEW HENRY MATTHEWS, a subject of the King of Great Britain and Ireland, of 8 Mecklenburgh Square, London, W. C., in the county of Middlesex, England, captain, Royal Engineers, have invented new and useful Improvements in Apparatus for Elevating or Conveying Boxes or other Articles, of which the following is a specification.

This invention relates to apparatus for elevating or conveying boxes or other articles, especially those which are of any uniform size and of rectangular form, or approximately so, or which have flat bases. Its particular object is to assist in the loading or unloading of ships' holds or the packing or emptying of warehouses, or it may be used for purposes of labeling, examining, counting, weighing, stacking or any other uses where a continuous feed or delivery is required, which can be instantly stopped or readily controlled, or it may sometimes be made to work automatically. My apparatus deals with the articles one at a time, and it may either despatch or receive them either in a horizontal or in an inclined direction.

My invention is illustrated by the accompanying drawings, in which Figure 1 is a side elevation, Fig. 2 an end elevation, Fig. 3 a plan (omitting the chutes or runways) and Fig. 4 a small diagrammatic elevation of a modification.

The same letters of reference denote the same or similar parts in the respective figures.

Referring to Figs. 1, 2 and 3, my present improvements comprise a table, the top A of which comprises two raised tracks each similar to a smooth metal or polished slab. Upon each side of this is a driving chain B, engaging with toothed wheels C worked by machinery, or, if preferred, by hand or other power. Either one slab or track may be used or two slabs or tracks. In the latter case, a third chain B' is also provided between them.

The sides or legs E of the table are a little wider apart than the chains B, so that the latter may work between them, and the top frame member of the table is extended in both directions toward rear and front as at F, somewhat beyond the length of the slab A. Such top frame members may consist of rails or girders 1 of appropriate length mounted on the table legs E.

Gravity runways G H are connected to the ends of the extensions F, one such runway at each end of the table, for receiving and passing the goods on. The connection may be a hinge J. Each runway can be tilted to the necessary angle for the proper working of the apparatus.

The gravity runway G which delivers the goods K on to the table or track, will be inclined in the direction thereof. The extremities of the slab A are curved downward at $a$ and cut as shown in Fig. 3 to prevent obstruction to the goods.

The chains B cause the goods to slide along to the farther end of the track, as follows.

Certain crossbars L on the chains B are provided to push the goods along and feed them on to the departing runway H not only when this is horizontal (see dotted position H' in Fig. 1), but also when it is set at a steep angle (as drawn in full lines in Fig. 1), for example up to 40° or so, or even steeper, if needs be. The runways G H need not necessarily be straight, as they might be formed concave, so as to join up more smoothly with the table top or track A. The latter need not necessarily have a smooth surface, as a series of anti-friction rollers, similar to gravity runways could be used instead.

In some constructions, see for instance, Fig. 4, more especially when the goods are being lowered down a steep receiving runway G, the weight of the goods K upon it can be arranged sometimes to give the necessary motion to the chains B without a motor. The direction of movement in Fig. 4 is the reverse of that in the other figures.

Driving bands could be employed instead of chains, but not so advantageously.

My invention also prevents one article from interfering with the next one in the series. This is prevented by insuring that each of the chains B (and B', if used) is divided up into equal lengths by the crossbars L above mentioned. These are mounted so as to pass a little above the table surface or track A, and the distance between the respective crossbars L is a little greater than the length of any one article K.

The apparatus will work with any article whose length is not greater than that of the table top or track A.

Describing in more detail my invention as used for the purpose of pushing the articles up an inclined—or along a level runway, (as shown in Fig. 1) I may design the apparatus as follows.

The chain wheels C are mounted on shafts M, there being two of these shafts which respectively carry the chain wheels at each end of the table. Said shafts are rotated through suitable gearing by a motor D of any kind, and the goods K run on to the table top or track A automatically down a gravity runway G set at a small gradient. The foremost article K will not be able to advance farther than the first crossbar L it touches, and it may not even reach such crossbar. The next crossbar L will come against the rear side of the article, which it will then push in front of it. This pushing continues until the crossbar has traveled to the end of the table or track and passed down out of engagement with the article.

The article may, perhaps slip back and come to a stop against the end edge of the table top or track, remaining there until pushed along by the following article. The column of articles will progress by the same movement.

The number of crossbars L depends upon the length of one article and the length of the chains, but three, as shown in the drawings, will be enough in most cases. Each is preferably a pair of rotatable rollers, as seen in Fig. 2.

When using the apparatus as modified according to Fig. 4, the articles K are lowered on to the table down a steep gravity runway G, and they can be held in check one by one, owing to the lowermost one coming to rest upon the edge of the table top end A, or track. As the chains B rotate, the next crossbar L rising from below at that edge will pick up the end of the article, lifting it clear of the edge, whereupon the others remaining on the runway G slide downward to a proportionate extent, forcing the article forward, which will finally be pushed off at the other end of the table or track by the succeeding crossbar.

Brackets N may be applied to the ends of the apparatus, and in a suitable position threaded rods O for adjusting the tension of the driving chains may be supplied. The apparatus may be carried upon rollers P.

I claim:

1. In combination with a supporting surface and means for mechanically feeding a series of boxes over the same, a delivery surface in continuation of said supporting surface and so disposed as to insure the feeding of the boxes in column by each other over said delivery surface.

2. In combination with a supporting surface and means for mechanically feeding a series of boxes over the same, a delivery surface in continuation of said supporting surface and upwardly inclined to insure the feeding of the boxes in column by each other over said delivery surface.

3. In combination with a supporting surface and means for mechanically feeding a series of boxes over the same, a delivery surface in continuation of said supporting surface and upwardly inclined to insure the feeding of the boxes in column by each other over said delivery surface, and means for preventing the return of a box from the delivery surface to the supporting surface.

4. In combination with a supporting surface and means for mechanically feeding a series of boxes over the same, a delivery surface in continuation of said supporting surface and upwardly inclined to insure the feeding of the boxes in column by each other over said delivery surface, means for feeding boxes to said supporting surface, and means for preventing the return of a box from the delivery surface to the supporting surface.

5. In combination with a supporting surface and means for mechanically feeding a series of boxes over the same, a delivery surface in continuation of said supporting surface and so disposed as to insure the feeding of the boxes in column by each other over said delivery surface, means for preventing return of said boxes from said delivery surface to said supporting surface, and means for preventing contact between said boxes and the aforesaid feeding means after said boxes have reached said delivery surface.

6. In combination with a supporting surface, a delivery surface in continuation of said supporting surface and so disposed as to insure the feeding of boxes in column by each other over said delivery surface, driving means, means carried by said driving means and adapted to engage said boxes and carry them across said supporting surface and deliver them to said delivery surface.

7. In combination with a supporting surface having a downwardly curved end adapted to operate as a stop, means for mechanically feeding boxes over the same, and a delivery surface in continuation of said supporting surface and having its adjacent end in a plane lower than that of the adjacent end of said supporting surface, said delivery surface being so disposed as to insure the feeding of boxes in column by each other over said delivery surface.

8. In combination with a supporting surface having a curved end adapted to act as a stop, means for mechanically feeding boxes over the same, said means terminating short of the curved end of said supporting surface, and a delivery surface in continuation of said supporting surface and having its adjacent end in a plane lower than that of the adjacent end of said supporting surface, said delivery surface being so disposed as to insure the feeding of boxes in column by each other over said delivery surface.

In testimony whereof, I have signed my name to this specification.

MATTHEW HENRY MATTHEWS.